(12) United States Patent
Brulz

(10) Patent No.: US 8,387,797 B1
(45) Date of Patent: Mar. 5, 2013

(54) MULTI-WALL PACKAGE

(75) Inventor: Dan F. Brulz, Wind Lake, WI (US)

(73) Assignee: Precision Color Graphics, Ltd., Franklin, WI (US)

( * ) Notice: Subject to any disclaimer, the term of this patent is extended or adjusted under 35 U.S.C. 154(b) by 0 days.

(21) Appl. No.: 12/798,998

(22) Filed: Apr. 14, 2010

(51) Int. Cl.
    *B65D 73/00* (2006.01)
(52) U.S. Cl. .................. 206/484; 383/109; 383/116
(58) Field of Classification Search .................. 206/484, 206/531, 484.2, 484.1; 383/116, 109
    See application file for complete search history.

(56) References Cited

U.S. PATENT DOCUMENTS

| | | | | |
|---|---|---|---|---|
| 4,460,426 A * | 7/1984 | Saito | ............................. | 156/277 |
| 5,032,448 A * | 7/1991 | Mendenhall | .................. | 428/189 |
| 6,890,102 B2 * | 5/2005 | Clark | ........................... | 383/105 |
| 7,157,126 B2 * | 1/2007 | Cosentino et al. | ........... | 428/34.3 |
| 2004/0191438 A1 * | 9/2004 | Cosentino et al. | ........... | 428/34.3 |
| 2004/0245145 A1 * | 12/2004 | Urban | ........................... | 206/531 |
| 2005/0087293 A1 * | 4/2005 | Colgan | ........................ | 156/291 |
| 2006/0275563 A1 * | 12/2006 | Duffy | ........................... | 428/34.2 |
| 2007/0059477 A1 * | 3/2007 | Perelman et al. | ............... | 428/58 |
| 2007/0117927 A1 * | 5/2007 | Han et al. | ...................... | 525/192 |
| 2008/0078502 A1 * | 4/2008 | Castillo et al. | ............. | 156/331.1 |
| 2008/0105587 A1 * | 5/2008 | Hawes et al. | ................. | 206/532 |
| 2008/0160327 A1 * | 7/2008 | Knoerzer et al. | ............. | 428/457 |

* cited by examiner

*Primary Examiner* — Luan K Bui
*Assistant Examiner* — Rafael Ortiz
(74) *Attorney, Agent, or Firm* — William W. Haefliger

(57) ABSTRACT

A package comprising at least one paper layer, the paper layers being biodegradable, and a sheet of film adherent to one of said layers, said film sheet being leak-proof, and biodegradable.

12 Claims, 2 Drawing Sheets

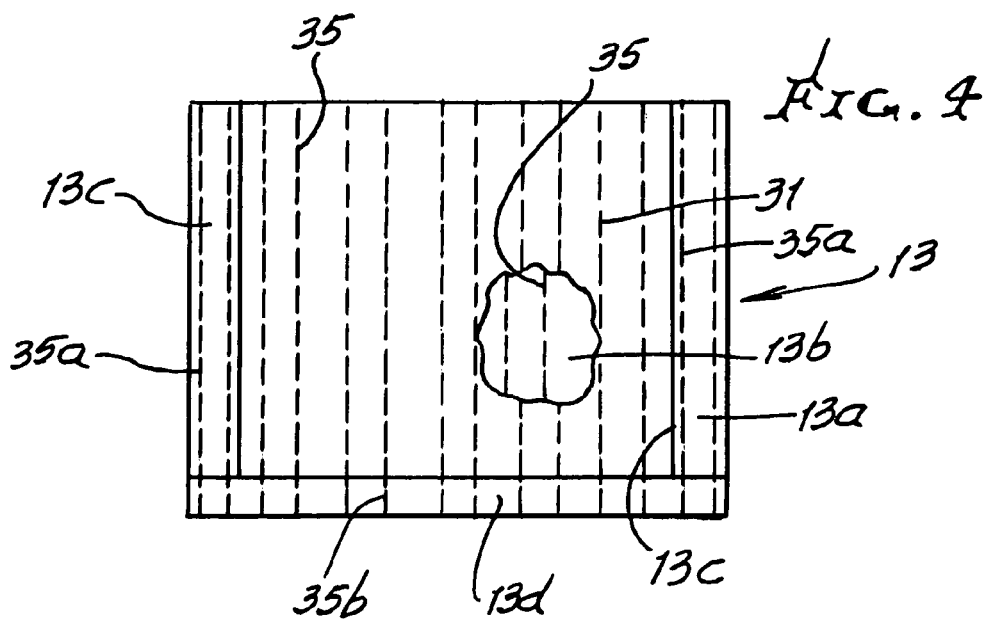
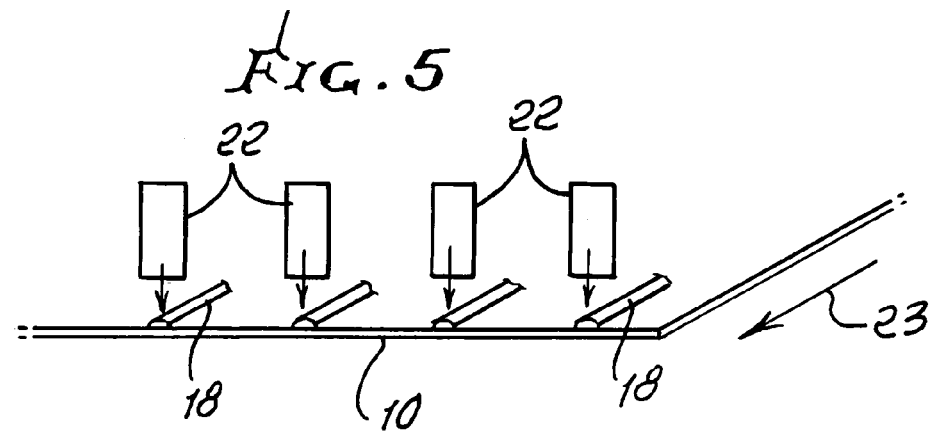
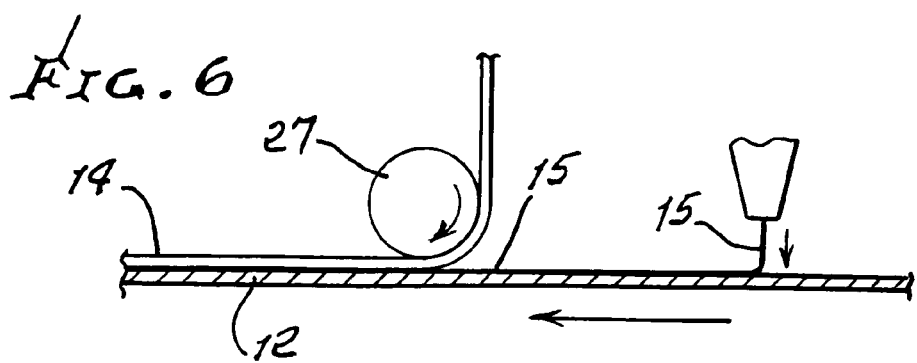

MULTI-WALL PACKAGE

BACKGROUND OF THE INVENTION

This invention relates generally to packaging, and more particularly to improvements in packages or bags having unusual advantages as to use and disposal.

There is need for packaging that is easily and readily fabricated, useful, bendable in one preferred direction, and disposable in accordance with environmental standards. In particular, there is need for bags as disclosed herein having the unusual advantages in construction, functions, use and results, as will be seen.

SUMMARY OF THE INVENTION

It is a major object of the invention to provide a package that comprises:

a) at least one paper layer, said paper layer being biodegradable, b) and a sheet of film adherent to one of said layers, said film sheet being leak-proof, and biodegradable.

As will be seen, the film sheet may typically consist of corn derivative from which starch has been removed, a preferred example being polylactic acid, a carbon neutral biopolymer.

It is another object to provide multiple of such paper layers, bonded together in superposed relation, and preferably adhesive stripes are employed and spaced apart to enhance flexibility and/or bendability of the bag wall or walls, the layers and adhesive being biodegradable. In this regard, the paper layers may consist of Kraft paper, or the like.

Yet another object is to provide three of such paper layers, bonded together with generally parallel extending stripes of adhesive, the lateral spacing between longitudinally extending stripes exceeding four times the widths of such stripes. As will be seen, stripes between first and second paper layers preferably extend in superposed relation to stripes between second and third paper layers, enhancing bag wall flexibility and bendability. Added objects include providing adhesive stripes adhering said film sheet to said at least one paper layer; orienting all of the adhesive stripes to extend longitudinally; and providing package folded edge portions incorporating adhesive stripes.

A further object is to provide a 100% organic, natural package that is 100% compostable in commercial composting environment.

These and other objects and advantages of the invention, as well as the details of an illustrative embodiment, will be more fully understood from the following specification and drawings, in which:

DRAWING DESCRIPTION

FIG. 4 is an elevation view of a bag incorporating the invention;

FIG. 5 is a schematic view showing a bag surface being striped with adhesive; and FIG. 6 is a schematic view of corn derivative film being laid down and adhesively bonded to one side of a group of paper layers.

DETAILED DESCRIPTION

Figure 1:
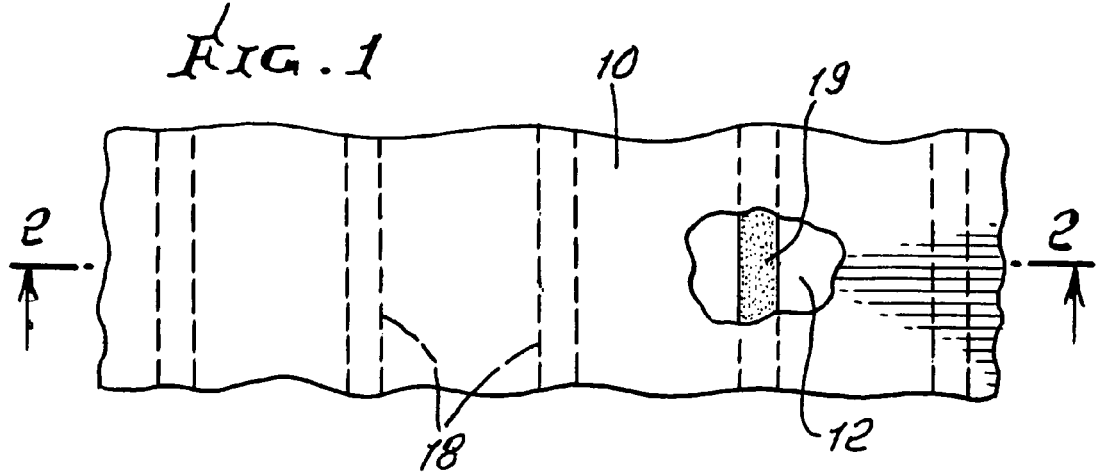
FIG. 1 is a plan view of preferred bag or package wall portion.
Figure 2:
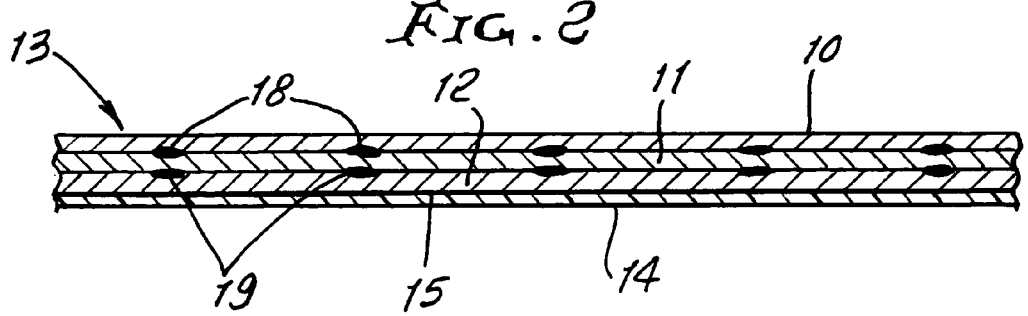
FIG. 2 is a section taken on lines 2-2 of FIG. 1.
Figure 3:
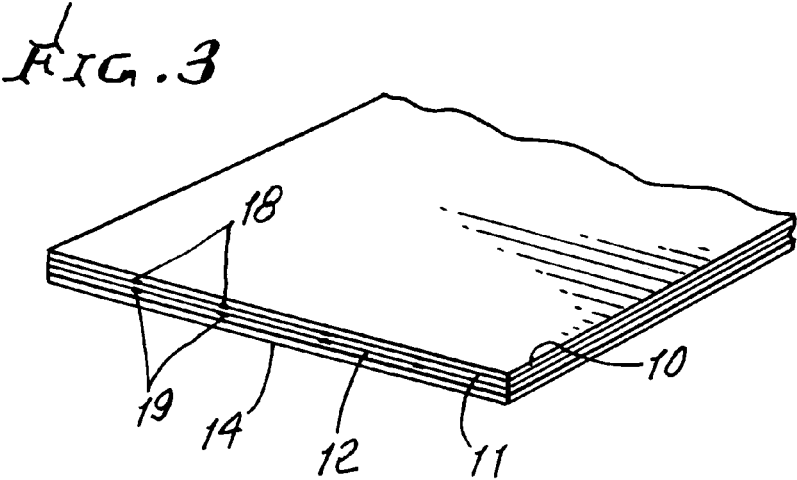
FIG. 3 is a perspective view of a section of bag wall.

In FIGS. 1 and 2, three paper layers 10, 11 and 12 are shown extending in side-by-side, superposed relation to form a preferred composite 13. Such layers typically and preferably consist of Kraft paper or the like, and which is biodegradable. A sheet 14 of biodegradable film is adhered to one side of the composite, as by provision of biodegradable adhesive 15, as shown. The film is a compostable, clear film made from annually renewable plant resources. PLA (polylactic acid) a carbon neutral low fat corn derivative biopolymer from which starch has been removed, is manufactured under the resin trade name of Ingeo. Advantageous properties of the film include:

| | |
|---|---|
| Scratch resistance | Excellent stiffness |
| FDA compliant | Good slip and dispensing properties |
| Dimensionally stable | Excellent lay flat capability |
| Easily treated to higher dyne levels | |
| Excellent printability | |

Properties of the film include:

| Physical Properties | Units | Typical Values | | | | | Test Methods |
|---|---|---|---|---|---|---|---|
| Thickness | mil | 0.80 | 1.00 | 1.20 | 1.60 | 2.00 | ASTM D4321 |
| | gauge | 80 | 100 | 120 | 160 | 200 | |
| Yield | in.2/lb | 27,680 | 22,144 | 18,453 | 13,840 | 11,072 | ASTM D4321 |

The film is further characterized as sufficiently leak proof to withstand, at least temporarily, any wetness associated with pet food.

One film is known as PLA produced by Earth First BCL at www.earthfirstpla.com, and meets ASTM D6400 standard specifications for compostable plastic material. The adhesive 15 consists of Reynco 53-462 PLW, a water based synthetic resin adhesive, a product of the Reynolds Company, Greenville, S.C. 29611.

The paper layers 10-12 are intermittently bonded together in superposed relation, by employment of adhesive stripes 18 and 19, which extend longitudinally in generally parallel relation, and are spaced apart laterally, for example by spacing 20 exceeding four times the width or width of the stripes. Note that the longitudinal stripes 18 between first and second layers 10 and 11 are superposed over the stripes 19 between layers 11 and 12. This maximizes bendability or flexibility of the composite, as in a lateral direction, slippage being accommodated at unbonded interfacing 21 between laterally spaced stripes 18 and laterally spaced stripes 19.

FIG. 5 shows progressive and controlled extrusion of adhesive such as at 18 via extruders 22 which are laterally spaced apart, the typical sheet 10 traveling in longitudinal direction 23, under the extruders. FIG. 6 shows film or film sheet 14 being unrolled or guided from a roll 27, and laid into the surface of paper layer 12, onto which adhesive 15 has been applied. The adhesive is preferably applied in stripes 31 that extend longitudinally superposed over stripes 18 and 19, and are laterally spaced apart, aiding bendability and flexibility of the composite in a lateral direction. Other methods are usable.

FIG. 4 shows stripe zones 35 extending longitudinally on bag front and back walls 13a and 13b, and stripe zones 35a and 35b extending longitudinally on bag folded edge portions 13c and 13d. Such folded edge portions are adhered to front wall 13a by adhesive stripes, extending longitudinally.

All adhesive material used in the process is biodegradable, and may consist of Reynco 53-462 PLM, a water based synthetic resin adhesive, a product of the Reynolds Company, Greenville, S.C. 29611.

The specification for the paper of the entire example bag 13 is: 1/50 cc Paper 2/50 NK 1 layer of PLA material. Different thicknesses of paper are usable, for heavier or lighter products.

I claim:

1. A package comprising
   a) multiple paper layers, said paper layer or layers being biodegradable,
   b) and a sheet of film adherent to one of said layers, said film sheet being leak-proof, and biodegradable,
   c) there being multiple of said paper layers extending in superposed relation, and spaced apart adhesive striping connecting adjacent surfaces of said paper layers, said adhesive striping and paper layers being everywhere substantially entirely biodegradable, there being unbonded paper interfaces between said striping,
   d) said multiple paper layers consisting of three layers, the striping consisting of spaced apart, parallel stripes,
   e) said three paper layers consisting of first, second and third paper layers, the stripes between the first and second paper layers being superposed relative to the stripes between the second and third paper layers, wherein all of the stripes are between said paper layers and are everywhere spaced from the film,
   f) and wherein the adhesive striping consists of a water based synthetic resin adhesive,
   g) the striping everywhere being linear and extending longitudinally continuously toward and to the paper layer edge and having terminal end portions at multiple equal intervals along said edge, and laterally crosswise of such edge to accommodate to retentive local folding of the layers and stripes, with fold-back of said striping terminal end portions at said edge,
   h) there being lateral spacing between the longitudinal stripes which substantially exceeds the width of the longitudinal stripes,
   i) the film consisting of polylactide polymer.

2. The package of claim 1 wherein the film sheet consists of corn derivative.

3. The package of claim 1 wherein the film sheet consists of PLA, a polylactide polymer product of Earth First BCL.

4. The package of claim 1 wherein said paper layers consist of Kraft paper, or the like.

5. The package of claim 1 characterized in that the stripes are positioned such that the package is more easily foldable in a lateral direction than in a longitudinal direction.

6. The package of claim 1 wherein the film sheet consists of corn derivative.

7. The package of claim 1 wherein the package defines a container having inner and outer sides, the film sheet located at the inner side of the container.

8. The package of claim 1 wherein the package defines a bag.

9. The package of claim 1 wherein said package includes folded edge portions incorporating adhesive stripes.

10. The package of claim 1, and there being said package folded edge portions incorporating said end portions consisting of said biodegradable adhesive, the package being 100% compostable.

11. A package comprising
    a) at least one biodegradable paper layer,
    b) and a sheet of film adherent to said at least one layer, said film sheet being leak-proof, and biodegradable,
    c) and spaced apart adhesive striping adherent to a surface or surfaces of said at least one paper layer, said adhesive striping and paper being everywhere substantially entirely biodegradable, there being unbonded interfaces between said striping,
    d) said striping consisting of spaced apart, parallel stripes,
    e) and wherein the adhesive striping consists of a water based synthetic resin adhesive,
    f) the stripes located between and spaced from outermost and opposite facing surfaces of the at least one paper layer, all of the stripes being everywhere spaced from the film sheet,
    g) the striping everywhere being linear and extending longitudinally and uninterruptedly to the paper layer edge and having terminal end portions at multiple equal lateral intervals along said edge, and laterally crosswise of such edge to accommodate to retentive local folding of the layers and stripes, with overlying fold-back of said striping terminal end portions at said edge, the paper layer and film and stripes terminating at said edge,
    h) the striping everywhere extending longitudinally after both lateral folding and longitudinal folding of the striped adherent paper layer and film sheet, at edges thereof,
    i) there being lateral spacing between the longitudinal stripes which substantially exceeds the width of the longitudinal stripes,
    j) and the film consisting of polylactide polymer,
    k) there being an additional adhesive layer between the film sheet and a paper layer surface, said additional adhesive layer everywhere spaced from said striping.

12. The package of claim 11, and wherein there are package folded edge portions incorporating equally laterally spaced apart parallel longitudinal rows of said adhesive.

* * * * *